United States Patent
Park (10) Patent No.: US 7,398,402 B2
(45) Date of Patent: Jul. 8, 2008

(54) SYSTEM, MEDIUM, AND CONTROL METHOD FOR A COMPUTER

(75) Inventor: Seong-geun Park, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 353 days.

(21) Appl. No.: 11/159,183

(22) Filed: Jun. 23, 2005

(65) Prior Publication Data
US 2005/0289372 A1 Dec. 29, 2005

(30) Foreign Application Priority Data
Jun. 24, 2004 (KR) .......... 10-2004-0047874

(51) Int. Cl.
*G01K 13/00* (2006.01)
(52) U.S. Cl. .......... 713/300; 713/310; 713/320; 713/321; 713/322; 713/323; 713/324; 713/330; 713/340; 714/13
(58) Field of Classification Search .......... 713/300, 713/310, 320–324, 330, 340, 501; 714/13
See application file for complete search history.

(56) References Cited

U.S. PATENT DOCUMENTS

| | | | |
|---|---|---|---|
| 5,287,244 A | 2/1994 | Hileman et al. | |
| 6,243,656 B1 * | 6/2001 | Arai et al. | 702/132 |
| 6,348,873 B1 | 2/2002 | Wang et al. | |
| 6,396,675 B1 | 5/2002 | Su | |
| 6,407,672 B1 | 6/2002 | Grenz et al. | |
| 6,643,126 B2 | 11/2003 | Su | |
| 6,928,565 B2 * | 8/2005 | Watts et al. | 713/322 |
| 7,135,962 B2 * | 11/2006 | Durbin et al. | 340/425.5 |
| 2002/0152406 A1 * | 10/2002 | Watts et al. | 713/300 |

FOREIGN PATENT DOCUMENTS

| | | |
|---|---|---|
| KR | 1998-015399 | 5/1998 |
| KR | 11-053062 | 2/1999 |
| KR | 20-0225450 | 3/2001 |
| KR | 20-0273663 | 4/2002 |
| KR | 2003-0008060 | 1/2003 |
| KR | 20-0304192 | 2/2003 |
| KR | 20-0313931 | 5/2003 |

OTHER PUBLICATIONS

Korean Office Action; mail date Jan. 20, 2006; Application No. 100-2004-0047874.

* cited by examiner

*Primary Examiner*—Abdelmoniem Elamin
(74) *Attorney, Agent, or Firm*—Staas & Halsey LLP (57) ABSTRACT

A computer including a central processing unit, a cooling fan, an operating system (OS), a temperature sensor sensing a temperature within the CPU, a mode selector for selecting one of a fan off mode and a fan on mode for the cooling fan, a microcomputer controlling the cooling fan based on a selected mode, and outputting a selection signal corresponding to the selected mode, and a BIOS controlling a clock frequency of the CPU based on a sensing result of the temperature sensor if the BIOS receives the selection signal corresponding to the fan on mode from the microcomputer, and allowing the OS to control the clock frequency of the CPU if the BIOS receives the selection signal corresponding to the fan off mode. Here, a computer system can permit a user to turn on/off a cooling fan and efficiently control heat generated from the CPU.

19 Claims, 4 Drawing Sheets

SYSTEM, MEDIUM, AND CONTROL METHOD FOR A COMPUTER

CROSS-REFERENCE TO RELATED APPLICATIONS

This application claims the benefit of Korean Patent Application No. 2004-0047874, filed on Jun. 24, 2004, in the Korean Intellectual Property Office, the disclosure of which is incorporated herein by reference.

BACKGROUND OF THE INVENTION

1. Field of the Invention

Embodiments of the present invention relate to systems, media, and control methods for a computer, and more particularly, to a system, medium, and method for controlling a computer system to turn on/off a cooling fan to cool down a central processing unit (CPU) based on a user's choice, and to efficiently control heat generated from the CPU while the cooling fan is turned off.

2. Description of the Related Art

Recently, integration levels of chips and clock speeds of CPUs have dramatically increased, enhancing performance of computer systems. However, the CPUs have become heated to very high temperatures due to the increased clock speeds of the CPUs, thereby resulting in the CPUs becoming defective or permanently damaged.

To prevent the CPU from becoming defective or damaged due to this CPU overheating, various solutions have been recommended. One of these solutions is to install a cooling fan near the CPU, sense temperatures within the CPU, and correspondingly turn on/off the cooling fan based on the sensed temperatures.

Figure 1:
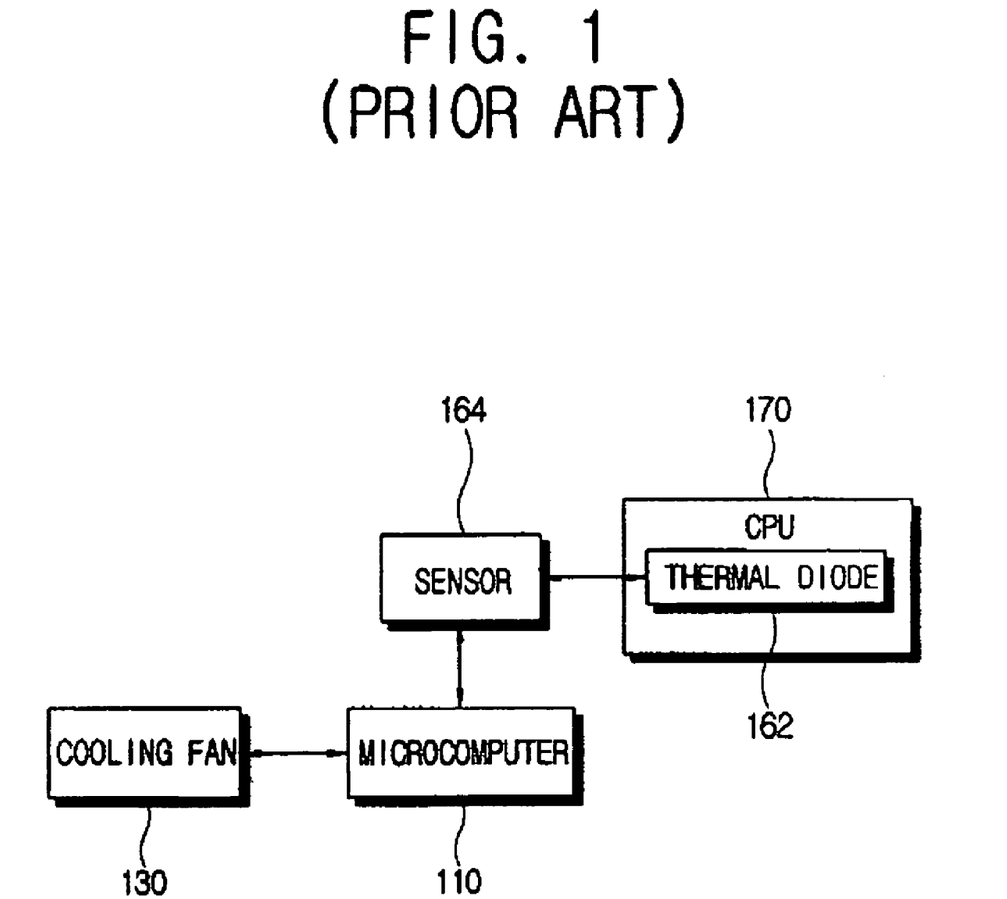
FIG. 1 illustrates a control block diagram of a conventional computer.

FIG. 1 is a control block of a conventional computer system using a cooling fan 130 to cool down a central processing unit (CPU) 170. As illustrated, the computer system can include a thermal diode 162 whose resistance changes in relation to changes in temperature within the CPU 170, a temperature sensor 164 sensing a voltage change, in accordance with the changing resistance of the thermal diode 162 and generating a corresponding temperature sensing signal, and a microcomputer 110 driving the cooling fan 130 based on the temperature sensing signal from the temperature sensor 164.

The conventional computer system has an advantage of offering stable operation of the CPU 170 by cooling down the CPU 170 using the fan 130, but it also suffers from a problem of noise being generated by the cooling fan 130.

Therefore, inventors of the present invention have found that a user may want to turn off the cooling fan 130 to reduce the noise generated therefrom if the user is working on the computer in a quiet place or performing simple word processing, for example.

On the other hand, if the user is working in a graphically heavy environment, requiring greater use of the CPU 170, the CPU 170 becomes heated to very high temperatures, and thus the cooling fan 130 also needs to be driven at maximum speed, requiring the user to endure the noise generated therefrom. This problem also needs to be solved.

SUMMARY OF THE INVENTION

Accordingly, it is an aspect of the present invention to provide a system, medium, and a control method for a computer system, capable of turning on/off a cooling fan to cool down a CPU based on a user's choice.

In addition, the system, medium, and the control method thereof enables the control of a clock frequency of the CPU corresponding to turning on/off the cooling fan, and thereby efficiently controls heat generated from the CPU when the cooling fan is turned off.

To achieve the above and/or other aspects and advantages, embodiments of the present invention set forth a computer system, including a central processing unit (CPU), a cooling fan, an operating system (OS), a temperature sensor sensing a temperature within the CPU, a mode selector for selecting one of a fan off mode, turning off the cooling fan, and a fan on mode, turning on the cooling fan, a microcomputer controlling the cooling fan based on the selected mode and outputting a selection signal corresponding to the selected mode, and a BIOS controlling a clock frequency of the CPU based on a sensing result of the temperature sensor if the BIOS receives the selection signal as corresponding to the fan on mode from the microcomputer, and allowing the OS to control the clock frequency of the CPU if the BIOS receives the selection signal as corresponding to the fan off mode.

The fan on mode may include a max fan mode to rotate the cooling fan at a maximum speed and a normal mode to rotate the cooling fan based on the sensing result of the temperature sensor, with the mode selector selecting one of the fan off mode, the max fan mode, and the normal mode.

In addition, the OS may control the clock frequency of the CPU based on the sensing result of the temperature sensor if the fan off mode is selected by the mode selector and the OS has been permitted to control the clock frequency of the CPU. If, under the fan off mode, a predetermined driving condition, previously requiring a particular control of the clock frequency of the CPU, is detected, the OS may alternatively controls the clock frequency of the CPU based on the sensing result of the temperature sensor without regard to the predetermined driving condition. The predetermined driving condition may be an OS setting requiring the clock frequency of the CPU to always be a particular speed or perform in a particular manner.

The computer system may include a mode display displaying the selected mode. The mode display may include a light emitting diode (LED) flashing light corresponding to the selected mode, or may display an image corresponding to the selected mode.

The mode selector may be a user interactive mode selector permitting a user to chose at least one of the fan off mode or fan on mode.

In addition, if the temperature sensor indicates that the temperature within the CPU has exceeded a predetermined temperature, at least one of the clock frequency of the CPU may be lowered and/or the a rotation speed of the cooling fan may be increased. Further, the rotation speed may be increased based upon a look up table.

To achieve the above and/or other aspects and advantages, embodiments of the present invention set forth a method of controlling a computer including a CPU and a cooling fan, the method including sensing a temperature within the CPU, selecting one of a fan off mode, turning off the cooling fan, and a fan on mode, driving the cooling fan on, driving the cooling fan in accordance with the selected mode, providing a BIOS of the computer with information of the selected mode, allowing the BIOS to control a clock frequency of the CPU based on the sensed temperature within the CPU if the fan on mode is selected, and having the BIOS allow the OS to control the clock frequency of the CPU if the fan off mode is selected.

The fan on mode may include a max fan mode and a normal mode, and the driving of the cooling fan in accordance with the selected driving mode including controlling the cooling fan to rotate at a maximum speed if the max fan mode is selected, and controlling the cooling fan to rotate corresponding to the sensed temperature within the CPU if the normal mode is selected.

The method may further include having the OS control the clock frequency of the CPU based on the sensed temperature within the CPU if the OS is allowed to control the clock frequency of the CPU. The OS may also control the frequency of the CPU regardless of a predetermined OS setting dictating differing control of the clock frequency of the CPU. In addition, the method may further include visually displaying the selected mode.

To achieve the above and/or other aspects and advantages, embodiments of the present invention set forth a medium including computer readable code implementing embodiments of the present invention.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
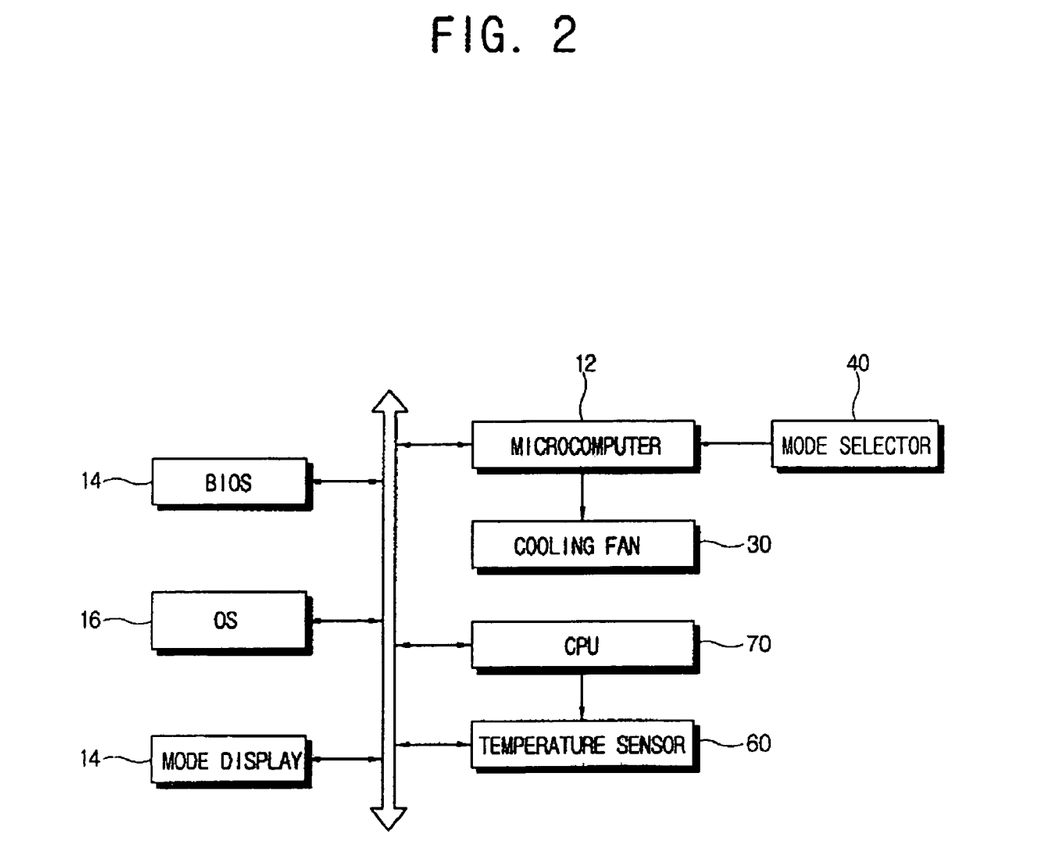
FIG. 2 illustrates a control clock diagram of a computer system, according to an embodiment of the present invention.

As illustrated in FIG. 2, a computer system embodiment of the present invention includes a central processing unit (CPU) 70, a temperature sensor 60 sensing a temperature within the CPU 70, a cooling fan 30 for cooling the CPU 70, a mode selector 40 controlling a driving mode of the cooling fan 30, and a microcomputer 12 controlling the cooling fan 30 in accordance with the selected driving mode of the cooling fan. Further, the computer system may include a mode display 50 displaying the driving mode of the cooling fan selected through the mode selector 40.

The driving mode of the cooling fan 30, according to an embodiment of the present invention, includes a fan off mode turning off the cooling fan 30 and a fan on mode turning on the cooling fan 30. Herein, the fan on mode may include a "max" fan mode that rotates the cooling 30 at a maximum speed and a "normal" mode for rotating the cooling fan 30 based on a sensed result of the temperature sensor 50.

Thus, a user can select one of the max fan mode, the fan off mode, and the normal mode, while considering circumstances under which the computer is/may be operated, and then the microcomputer 12 can control the cooling fan 30 according to the selected driving mode of the cooling fan.

For example, the user may want to reduce the noise generated by the cooling fan 30, e.g., if the user works on the computer in a quiet place or as merely a word processor. Thus, the user selects the fan off mode through the mode selector 40 to turn off the cooling fan 30.

Further, if the user works on graphically intensive operations, the CPU 70 might become overheated. Here, the user may select the max fan mode, through the mode selector 40, to rotate the cooling fan 30 at a maximum speed.

Meanwhile, the microcomputer 12, according to an embodiment of the present invention, can generate a mode selection signal corresponding to the selected mode. The mode selection signal may be transmitted to a basic input output system (BIOS) 14.

In addition, the microcomputer 12 may provide information about the temperature sensed by the temperature sensor 60 to the BIOS 14 and/or an operating system (OS) 16. Herein, the microcomputer 12 may provide the temperature information to the BIOS 14 or the OS 60 through a low pin count (LPC) interface, for example.

The BIOS 14, according to an embodiment of the present invention, can control a clock frequency of the CPU 70 based of a detected result from the temperature sensor 60 if the BIOS 14 receives the mode selection signal corresponding to the fan on mode from the microcomputer 12. However, if the BIOS 14 receives the selection signal corresponding to the fan off mode from the microcomputer 12, the BIOS 14 may have the OS 16 control the clock frequency of the CPU 70. Thus, if the user selects for the cooling fan 30 to be turned off, the OS 16 can then control the clock frequency of the CPU 70 and thereby control the heat generated from the CPU 70.

Figure 3:
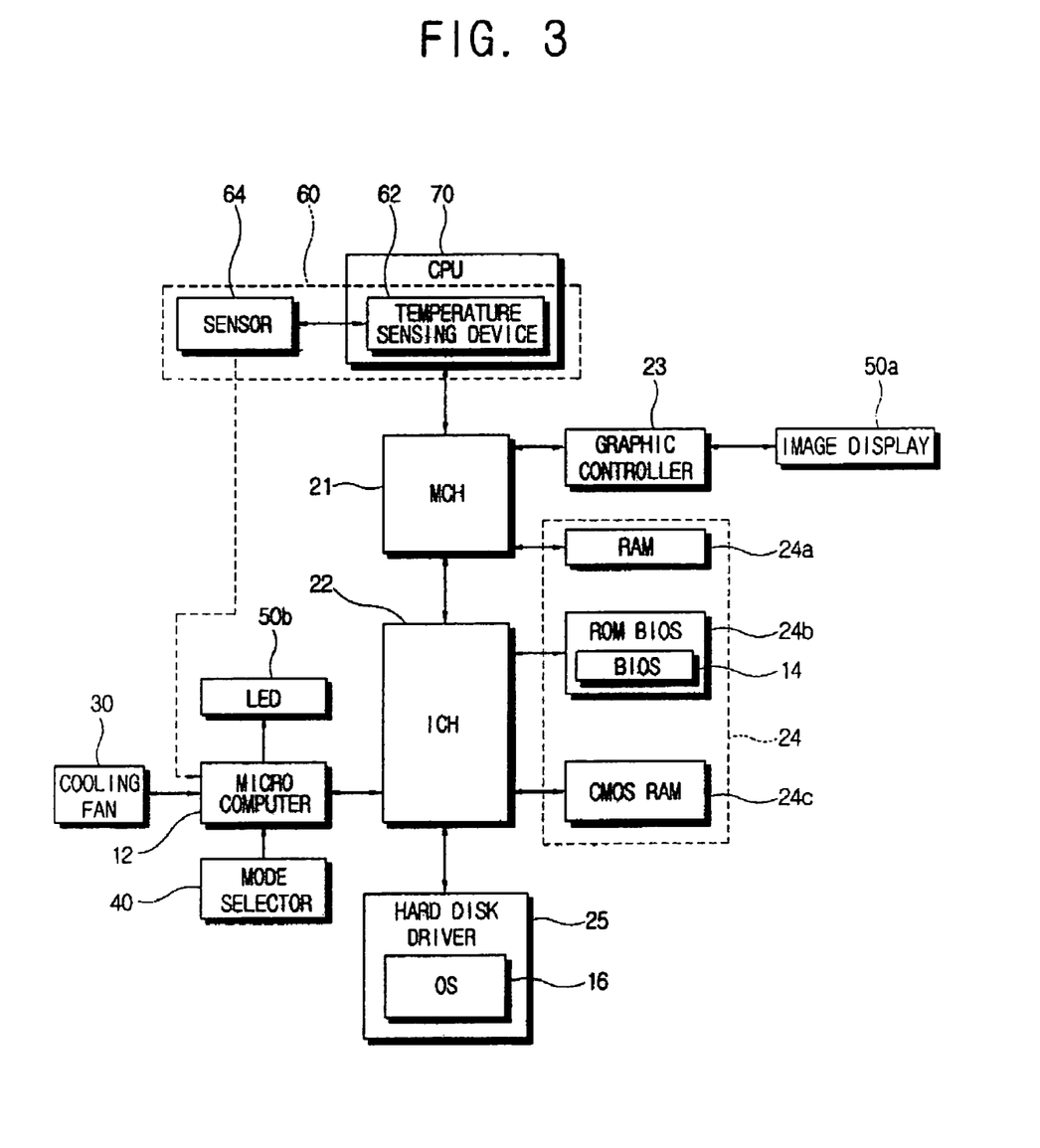
FIG. 3 illustrates a control block diagram of a computer system, according to an embodiment of the present invention.

Hereinafter, a computer system according to an embodiment of the present invention will be described in detail, referring to FIG. 3.

A computer system 70, according to the embodiment of the present invention, includes a CPU 70, a graphics controller 23 connected to an image display 50a and outputting a video signal to the image display 50a, a memory 24, a memory control hub (MCH) 21 and an input/output control hub (ICH) 22.

The memory 24 may include a random access memory (RAM) 24a, as a non-volatile memory, a ROM BIOS 24b and a CMOS RAM 24c.

The MCH 21 can manage the RAM 24a and data traveling between the CPU 70, the RAM 24a, the graphics controller 23, and the ICH 22. Herein, the graphics controller 23 and the MCH 21 may be provided as one chipset, e.g., a graphics memory control hub (GMCH).

The ICH 22 manages data traveling between hardware components, such as the ROM BIOS 24b, the CMOS RAM 24c, and a hard disk drive (HDD) 25, excluding the RAM 24a and the graphics controller 23, which may be connected to the MCH 22, for example.

Here, the HDD 25 is connected to the ICH 22, and may include an OS 16, for example, one of the Windows series of operating systems, developed by Microsoft Corporation.

A temperature sensor 60, according to an embodiment of the present invention, can sense a temperature within the CPU 70 when the computer is turned on, and may output a sensing result to the microcomputer 12. Herein, the temperature sensor 60 may include a temperature sensing device 62 changing a characteristic about itself whenever the temperature within the CPU 70 changes, e.g., a resistance of the temperature sensing device 62 might change based on temperature, and a sensor 64 generating a temperature sensing signal corresponding to such a characteristic of the temperature sensing device 62.

The temperature sensing device 62 may include a thermal diode, with a resistance of the thermal diode varying on a change in temperature within the CPU 70. Accordingly, an amount of voltage of the thermal diode may vary corresponding to the variable resistance. Herein, the sensor 64 can sense the change of the voltage corresponding to the change of the resistance of the thermal diode, and output a corresponding temperature sensing signal to the microcomputer 10.

As described, the microcomputer 12 can drive the cooling fan 30 based on the mode selection signal from the mode selector 40. In other words, the microcomputer 23 can control the cooling fan 30 to rotate at a maximum speed if the user selects the max fan mode through the mode selector 40. Further, if the user selects the fan off mode, the microcomputer 12 can turn off the cooling fan 30, without regard to the sensing result of the temperature sensor 60.

Also, the microcomputer 12 can control the BIOS 14 to perform a BIOS active mode if one of the normal or max fan modes is selected, and control the BIOS 14 to perform a BIOS passive mode if the fan off mode is selected.

Herein, the BIOS 14 can receive the sensing result of the temperature sensor 60 from the microcomputer 12, and control the clock frequency of the CPU 70 based on the sensing result of the temperature sensor 60. For example, if the BIOS 14 determines that the temperature within the CPU 70 exceeds a predetermined throttling trip point 1 (TTP1), based on a sensing result of the temperature sensor 60, transmitted from the microcomputer 12, the BIOS 14 may control the clock frequency of the CPU 70 to change in accordance with the sensed temperature within the CPU 70. Thus, if the temperature within the CPU 70 exceeds the predetermined throttling trip point TTP1, the BIOS 14 can be converted into a throttling mode, of the advanced configuration and power interface (ACPI), and control the cooling fan 30 with reference to a predetermined temperature/rotation speed table, for example.

Further, if the max fan mode is selected through the mode selector 40 and the BIOS 14 performs the BIOS active mode, the BIOS 14 may control the clock frequency of the CPU 70 to operate at a maximum speed. That is, the computer becomes highly facilitated by maximizing the clock frequency of the CPU 70, since the rotation speed of the cooling fan 30 is also maximized under the max fan mode.

Meanwhile, if the fan off mode is selected through the mode selector 40, and the BOIS 14 performs the BOIS passive mode, the clock frequency of the CPU 70 may be controlled by the OS 16. Herein, the OS 16 will receive the information about the temperature within the CPU 70 from the microcomputer 12 and controls the clock frequency of the CPU 70 based on the same.

In addition, although the BOIS performs a predetermined driving mode (for example, "the BIOS passive mode") to change the clock frequency of the CPU 70 under the fan off mode, the OS 16 may control the clock frequency of the CPU 70 based on the temperature information within the CPU 70, without regard to the predetermined driving mode.

For example, the OS 16 may be the aforementioned Windows operating system and offer a power management menu, and the OS 16 may control the clock frequency of the CPU 70 to be set to its highest setting, without regard to the temperature within the CPU 70, if the user selects "Always On" through the power management menu. At this time, the OS 16 may become able to control the clock frequency of the CPU 70 based on the temperature information within the CPU 70, received from the microcomputer 12, although the power management menu is set to "Always On" and the fan off mode is selected through the mode selector 40.

Herein, if the OS 16 determines that the temperature within the CPU 70 exceeds a thermal trip point TTP2, the OS 16 can lower the clock frequency of the CPU 70 in accordance with a speed step/throttling mode of the ACPI.

Meanwhile, if the normal mode is selected, through the mode selector 40, the microcomputer 12 and the BIOS 14 can control the turning on/off and rotation speed of the cooling fan 30 and the clock frequency of the CPU 70, corresponding to the temperature changes within the CPU 70.

The mode selector 40, according to an embodiment of the present invention, may include an input device such as a keyboard or a mouse outputting a key signal in response to the user's operation. For example, a function key or a hot key can be provided on the keyboard or the mouse to select the driving mode of the cooling fan 30, and thus, the microcomputer 12 can detect the input key signal of the function key or the hot key, for example.

Further, the mode selector 40 may include an input device with a graphic user interface (GUI). Herein, the GUI may be provided through the OS 16, or a separate application program. Thus, the user may select the driving mode of the cooling fan 30 through the GUI using the mouse as the input device, for example.

Meanwhile, the mode display 50, according to an embodiment of the present invention, may include the image display 50*a*. In this case, the microcomputer 12 can allow the BOIS 14 to provide information about the selected driving mode to the OS 16, and the OS 16 can visually provide the user with information about a currently selected driving mode of the cooling fan 30. Herein, the information about the current driving mode of the cooling fan 30 displayed on the image display 50*a* may also be provided through a separate application program.

Further, the mode display 50, according to an embodiment of the present invention, may include a light emitting diode (LED) 50*b* connected to the microcomputer 12. Herein, the microcomputer 12 can control a flashing of the LED, e.g., using different colors of light respectively corresponding to the driving mode of the cooling fan 30. For example, the current driving mode of the cooling fan 30 can be visually distinguished by turning on a red LED 50*b*, representing the max fan mode, turning on a green LED 50*b*, representing the normal mode, and flashing the red LED 50*b* at regular intervals to represent the fan off mode.

Figure 4:
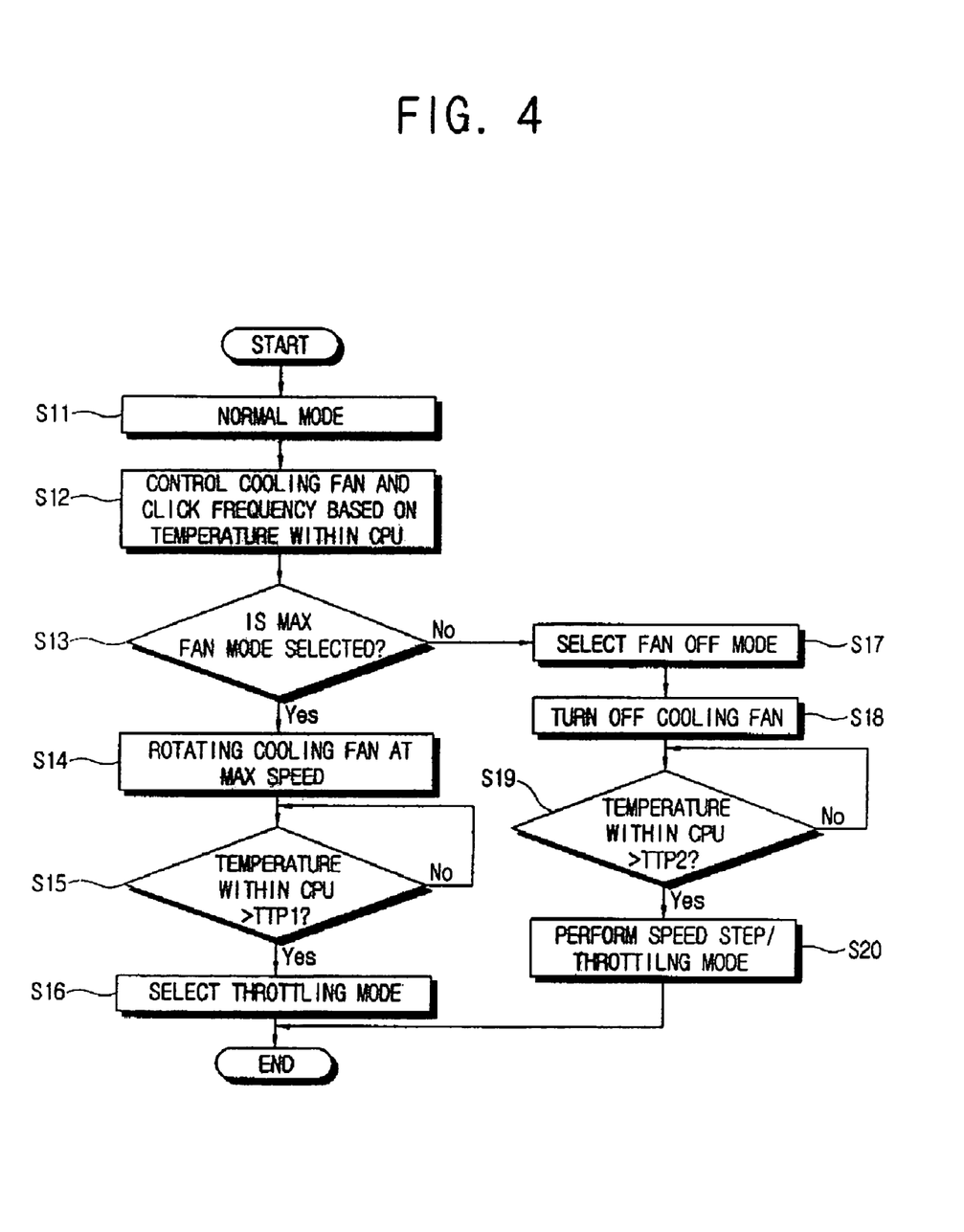
FIG. 4 illustrates a control flow diagram for a computer system, according to an embodiment of the present invention.

With the foregoing configuration, a control method of the computer system, according to an embodiment of the present invention, will be described hereinafter, referring to FIG. 4.

First, if the computer is operated in a normal mode (S11), e.g., the normal mode having been previously selected through the mode selector 40, the microcomputer controls the turning on/off and rotation speed of the cooling fan 30 based on the temperature within the CPU 70 sensed by the temperature sensor 60, in operation S12.

Further, the microcomputer 12 can notify the BIOS 14 that the normal mode has been selected, and the BIOS 14 can performs the BIOS active mode, as previously described, and control the clock frequency of the CPU 70 based on the temperature information within the CPU 70.

At this moment, if the user selects the driving mode of the cooling fan 30, through the mode selector 40, the microcomputer 12 can check whether the selected driving mode of the cooling fan 30 is the max fan mode or the fan off mode, in operation S13.

Herein, if the max fan mode has been selected by the user, the microcomputer 12 controls the cooling fan 30 to rotate at a maximum speed, in operation S14. Here, the microcomputer 12 can provide the BIOS 13 with the temperature information within the CPU 70, as sensed by the temperature sensor 60, and the microcomputer 12 can controls the clock frequency of the CPU 70, in response thereto. Herein, the BIOS 14 can check whether the temperature within the CPU 70 exceeds the aforementioned TTP1, in operation S15, and perform the throttling mode if the temperature within the CPU 70 exceeds the TTP1, in operation S16.

Meanwhile, if the user selects the fan off mode through the mode selector 40, in operation S17, the microcomputer 12 can turn off the cooling fan 30, in operation S18. At this moment, the BIOS 14 allows the OS 16 to control the clock frequency of the CPU 70, and the OS 16 can check whether the temperature within the CPU 70 exceeds the TTP2, in operation S19, and performs the speed step/throttling mode if the temperature within the CPU 70 exceeds the TTP2.

According to the foregoing embodiment, the temperature sensor 60 can be composed of the temperature sensing device 62 and the sensor 64, though not limited thereto, as long as the temperature sensor 60 is capable of sensing the temperature within the CPU 70.

Likely, the cooling fan 30 is turned on/off based upon the user's choice, such that the heat generated by the CPU 70 can be efficiently controlled by having the OS 16, the temperature sensor 60 sensing the temperature within the CPU 70, the mode selector 40 provided to select one of the fan off mode to turn off the cooling fan 30 and the fan on mode to turn on the cooling fan 30 therethrough, the microcomputer 12 controlling the cooling fan 30 based on the selected driving mode and outputting the selected mode signal corresponding to the selected driving mode, and the BIOS 14 controlling the clock frequency of the CPU 70 based on the sensing result of the temperature sensor 60, if the received selected mode signal corresponds to the fan on mode, and allowing the OS 16 to control the clock frequency of the CPU 70 if the received mode selected signal, corresponding to the fan off mode from the microcomputer 12.

In addition to the above described embodiments, embodiments of the present invention can also be implemented through computer readable code and implemented in general-use digital computers through use of a computer readable medium including the computer readable code. The computer readable medium can correspond to any medium/media permitting the storing or transmission of the computer readable code.

This computer readable code can be recorded/transferred on a computer readable medium in a variety of ways. Examples of the computer readable medium may include magnetic storage media (e.g., ROM, floppy disks, hard disks, etc.), optical recording media (e.g., CD-ROMs, or DVDs), and storage media such as carrier waves (e.g., transmission through the Internet).

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A computer system, comprising:
   a central processing unit (CPU);
   a cooling fan;
   an operating system (OS);
   a temperature sensor sensing a temperature within the CPU;
   a mode selector for selecting one of a fan off mode, turning off the cooling fan, and a fan on mode, turning on the cooling fan;
   a microcomputer controlling the cooling fan based on the selected mode and outputting a selection signal corresponding to the selected mode; and
   a BIOS controlling a clock frequency of the CPU based on a sensing result of the temperature sensor if the BIOS receives the selection signal as corresponding to the fan on mode from the microcomputer, and allowing the OS to selectively control the clock frequency of the CPU if the BIOS receives the selection signal as corresponding to the fan off mode,
   wherein if, under the fan off mode, a predetermined driving condition, previously requiring a particular control of the clock frequency of the CPU, is detected, the OS selectively controls the clock frequency of the CPU based on the sensing result of the temperature sensor without regard to the predetermined driving condition.

2. The computer system of claim 1, wherein the fan on mode comprises a max fan mode to rotate the cooling fan at a maximum speed and a normal mode to rotate the cooling fan based on the sensing result of the temperature sensor, with the mode selector selecting one of the fan off mode, the max fan mode, and the normal mode.

3. The computer system of claim 2, wherein the OS selectively controls the clock frequency of the CPU based on the sensing result of the temperature sensor if the fan off mode is selected by the mode selector and the OS has been permitted to control the clock frequency of the CPU.

4. The computer system of claim 1, wherein the predetermined driving condition is an OS setting requiring the clock frequency of the CPU to always be a particular speed or perform in a particular manner.

5. The computer system of claim 2, further comprising a mode display displaying the selected mode.

6. The computer system of claim 5, wherein the mode display comprises a light emitting diode (LED) flashing light corresponding to the selected mode.

7. The computer system of claim 6, wherein the mode display displays an image corresponding to the selected mode.

8. The computer system of claim 1, wherein the mode selector is a user interactive mode selector permitting a user to chose at least one of the fan off mode or fan on mode.

9. The computer system of claim 1, wherein, if the temperature sensor indicates that the temperature within the CPU has exceeded a predetermined temperature, at least one of the clock frequency of the CPU is selectively lowered and/or the a rotation speed of the cooling fan is selectively increased.

10. The computer system of claim 8, wherein a rotation speed of the cooling fan is increased based upon a look up table.

11. A method of controlling a computer comprising a CPU and a cooling fan, the method comprising:
   sensing a temperature within the CPU;
   monitoring for a selecting of one of a fan off mode, turning off the cooling fan, and a fan on mode, driving the cooling fan on;
   driving the cooling fan in accordance with the selected mode;
   providing a BIOS of the computer with information of the selected mode, such that the BIOS controls a clock frequency of the CPU based on the sensed temperature within the CPU if the fan on mode is selected, and the BIOS allows the OS to selectively control the clock frequency of the CPU if the fan off mode is selected, wherein if, under the fan off mode, a predetermined driving condition, previously requiring a particular control of the clock frequency of the CPU, is detected, the method of controlling the computer further comprises selectively controlling the clock frequency of the CPU based on the sensed temperature without regard to the predetermined driving condition.

12. The method of claim 11, wherein the fan on mode comprises a max fan mode and a normal mode, and the driving of the cooling fan in accordance with the selected driving mode comprises:

controlling the cooling fan to rotate at a maximum speed if the max fan mode is selected; and controlling the cooling fan to rotate corresponding to the sensed temperature within the CPU if the normal mode is selected.

13. The method of claim 12, further comprising having the OS selectively control the clock frequency of the CPU based on the sensed temperature within the CPU if the OS is allowed to control the clock frequency of the CPU.

14. The method of claim 12, further comprising visually displaying the selected mode.

15. A computer system, comprising:

a processing unit;

a cooling fan;

a temperature sensor sensing a temperature of the computer system;

a mode selector to select one of a fan off mode, turning off the cooling fan, and a fan on mode, turning on the cooling fan, wherein the cooling fan is controlled to turn on and off based on the selected mode, with a clock frequency of the processing unit being selectively controlled based on a sensing result of the temperature sensor when the mode is the fan on mode, and wherein if, under the fan off mode, a predetermined driving condition, previously requiring a particular control of the clock frequency of the processing unit, is detected, the computer system selectively controls the clock frequency of the processing unit based on the sensing result of the temperature sensor without regard to the predetermined driving condition.

16. The computer system of claim 15, wherein the predetermined driving condition is an computer system setting requiring the clock frequency of the processing unit to always be a particular speed or perform in a particular manner.

17. A computer system control method, comprising:

sensing a temperature of a computer system;

monitoring a mode selector for selecting one of a fan off mode, turning off a cooling fan of the computer system, and a fan on mode, turning on the cooling fan, turning the cooling fan on and off based on a monitored selected mode of the mode selector, with a clock frequency of a processing unit of the computer system being selectively controlled based on the sensed temperature when the mode is the fan on mode, and wherein if, under the fan off mode, a predetermined driving condition, previously requiring a particular control of the clock frequency of the processing unit, is detected, the computer system control method further comprises selectively controlling the clock frequency of the processing unit based on the sensed temperature without regard to the predetermined driving condition.

18. The computer system control method of claim 17, wherein the predetermined driving condition is a computer system setting requiring the clock frequency of the processing unit to always be a particular speed or perform in a particular manner.

19. The method of claim 11, wherein the predetermined driving condition is a computer system setting requiring the clock frequency of the CPU to always be a particular speed or perform in a particular manner.

* * * * *

UNITED STATES PATENT AND TRADEMARK OFFICE
CERTIFICATE OF CORRECTION

PATENT NO.       : 7,398,402 B2  
APPLICATION NO.  : 11/159183  
DATED            : July 8, 2008  
INVENTOR(S)      : Seong-geun Park Page 1 of 1

It is certified that error appears in the above-identified patent and that said Letters Patent is hereby corrected as shown below:

Column 8, Line 51-52, change "the a" to --a--.

Column 8, Line 67, change "selected," to --selected--.

Column 10, Line 9, change "is an" to --is a--.

Signed and Sealed this

Eighteenth Day of November, 2008

JON W. DUDAS  
*Director of the United States Patent and Trademark Office*